(12) United States Patent
Schultz

(10) Patent No.: US 8,105,049 B2
(45) Date of Patent: Jan. 31, 2012

(54) HYDRAULIC SYSTEM FOR A TRANSMISSION WITH PUMP INLET DIFFUSER

(75) Inventor: John C. Schultz, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 719 days.

(21) Appl. No.: 12/264,346

(22) Filed: Nov. 4, 2008

(65) Prior Publication Data
US 2010/0111718 A1    May 6, 2010

(51) Int. Cl.
*F04B 53/16*    (2006.01)
*F04B 53/20*    (2006.01)

(52) U.S. Cl. .......... 417/151; 417/79; 417/313; 210/437; 210/440; 210/307

(58) Field of Classification Search .................... 417/79, 417/89, 313, 423.9, 151; 210/307, 440, 130, 210/235, 258, 416.1, 454, 459, 460, 437; 285/376, 401
See application file for complete search history.

(56) References Cited

U.S. PATENT DOCUMENTS
7,281,904 B2   10/2007   Schultz et al.

OTHER PUBLICATIONS

Igor J. Karissik, Pump Handbook (2d Ed. 1986), Chapter 4, p. 4.22, Jet Pumps (written by Alex M. Jumpeter), McGraw-Hill, Inc.

*Primary Examiner* — Karabi Guharay
*Assistant Examiner* — Elmito Breval
(74) *Attorney, Agent, or Firm* — Quinn Law Group, PLLC

(57) ABSTRACT

A hydraulic system for a transmission has a diffuser housing with a fluid inlet passage that feeds one or more pump inlet ports, and a fluid return passage, such as to return fluid from a pressure regulator valve, that is in fluid communication with the fluid inlet passage. The hydraulic system also has a filter housing with a filter outlet portion that is in fluid communication with the fluid inlet passage upstream of the pump inlet port(s). The fluid return passage is downstream of the filter outlet portion. Thus, flow through the fluid return passage can create suction, causing increased flow through the filter outlet portion, such as from a fluid sump. Specifically, the diffuser housing is configured so that the fluid inlet passage has a converging portion downstream of the filter outlet portion and a diverging portion downstream of the converging portion.

20 Claims, 2 Drawing Sheets

HYDRAULIC SYSTEM FOR A TRANSMISSION WITH PUMP INLET DIFFUSER

TECHNICAL FIELD

The invention relates to a transmission hydraulic system with a diffuser for a pump inlet of a transmission pump.

BACKGROUND OF THE INVENTION

A fixed displacement pump has a theoretical fixed output of oil for each revolution of the pump, assuming the pump chambers are completely filled. The pump thus has an output proportional to the speed of the pump. An engine driven pump for a transmission will thus have a wide output range dependent on engine speed. The pump must be sized for the most demanding application, which is a low speed garage shift when high output volume is required at low speed. The pump must be filled adequately at such a low speed in order to sufficiently pressurize the transmission in order to accomplish the shift. However, sizing the pump to satisfy a low speed condition will create very large potential flow volume at high speeds. The hydraulic system feeding the pump may reach a high speed fill limit, i.e., a maximum fluid input into the pump is reached and is insufficient to keep the pump chambers full at high speeds. This will cause incomplete filling of the chambers, resulting in an air and oil combination in the chambers, potentially causing cavitation. Cavitation may cause pressure instability that interferes with transmission control valves, potentially gives rise to objectionable noise, and can cause physical damage to the pump.

Introducing pump bypass oil near a filter outlet feeding into the pump is known to create a pressure differential between the bypass oil feed into the pump and the filter outlet to thereby draw additional oil through the filter outlet from a sump, decreasing cavitation. Bypass oil is excess pressurized oil from the pump that is returned to the filter outlet without being delivered to the transmission. Bypass oil flow is controlled by a regulator valve that directs bypass oil away from the transmission when excess fluid pressure is detected at the pump outlet. Increasing the fuel efficiency of a vehicle can be accomplished, in part, by reducing the transmission pump size. A smaller pump has an associated decrease in bypass oil flow. Increasing inlet flow at high speeds is more challenging with a smaller pump.

One mechanism for increasing the volume of pumped fluid is a siphon used for draining flooded basements. Such a siphon may utilize a diffuser at a discharge end. Pressurized fluid flows through an inlet, either through an annular nozzle or a standard nozzle, creating a pressure differential to siphon fluid through an adjacent suction port.

SUMMARY OF THE INVENTION

An improved hydraulic system is provided that is especially useful for decreasing cavitation at high pump speeds even in relatively small fixed displacement pumps. Specifically, a hydraulic system for a transmission is provided that has a housing, referred to herein as a diffuser housing, with a fluid inlet passage that feeds one or more pump inlet port(s), and a fluid return passage, such as to return fluid from a pressure regulator valve, that is in fluid communication with the fluid inlet passage. The hydraulic system also has a filter housing with a filter outlet portion that is in fluid communication with the fluid inlet passage upstream of the pump inlet port(s). The fluid return passage is downstream of the filter outlet portion. Thus, flow through the fluid return passage can create suction, causing increased flow through the filter outlet portion, such as from a fluid sump. The fluid inlet passage is designed to increase the efficiency of flow through the filter outlet portion. Specifically, the diffuser housing is configured so that the fluid inlet passage has a converging portion downstream of the filter outlet portion and a diverging portion of gradually increasing flow area downstream of the converging portion. The diverging portion may have a frustoconical shape or a similar shape in which any cross-section taken perpendicular to a center axis through the diverging portion has a flow area equal to a corresponding cross-section of the diverging portion of frustoconical shape.

Preferably, the converging portion of the diffuser housing tapers inward at a 10 degree taper, while the diverging portion flares outward at a 5 degree flare. However, the converging and diverging portions may have other taper and flare angles, respectively, based on packaging considerations. The diverging portion may have a most beneficial effect on fluid flow and decreased cavitation when a length to width ratio of the diverging portion is between about 6 to 8; however, length to width ratios of 2 or more are acceptable.

In one embodiment, the filter outlet portion is coaxial with the converging portion and forms a nozzle at a terminal end. An annular inlet is formed around the nozzle between the nozzle and the converging portion and fluid from the fluid return passage reenters the fluid inlet passage through the annular inlet.

In another embodiment, the fluid return passage is coaxial with the converging portion. Fluid from the filter outlet portion enters the fluid inlet passage at an angle to the converging portion, such as generally perpendicular to the converging portion. A nozzle insert may be secured to the diffuser housing coaxial with the fluid return passage. Thus, fluid flows from the bypass passage through the nozzle insert, causing a pressure differential to draw more fluid from the sump. The nozzle insert may have a converging portion to increase velocity, or may have a converging portion and a diverging portion.

The diverging portion of the fluid inlet passage in each of the embodiments increases fluid pressure at the pump inlets, decreasing cavitation and maximizing the efficiency of flow through the fluid return passage even for relatively small pump sizes that have less bypass flow.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
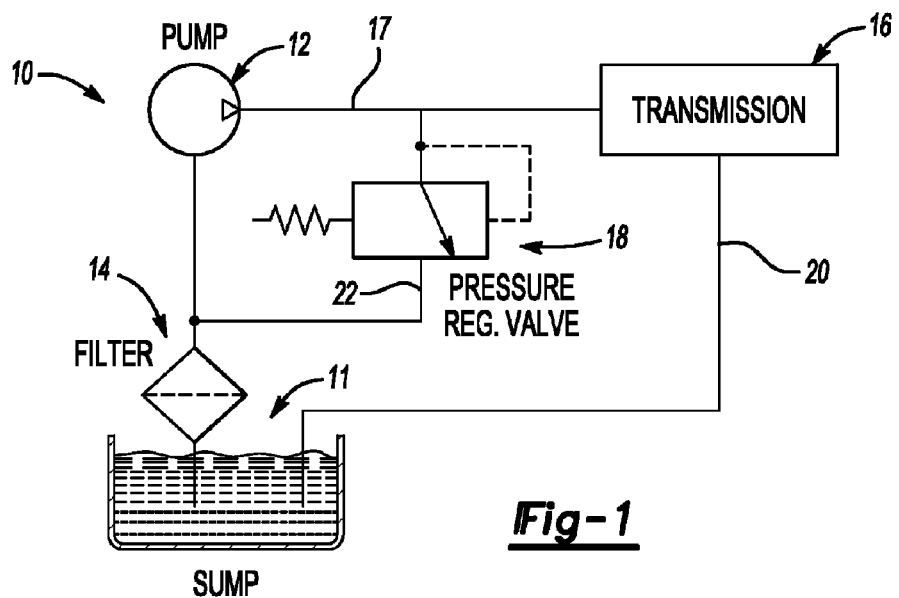
FIG. 1 is a schematic cross-sectional illustration of a hydraulic system and transmission.

Referring to the drawings, wherein like reference numbers refer to like components, there is seen in FIG. 1 a schematic representation of a hydraulic system 10 including a sump or reservoir 11 which contains hydraulic fluid. A transmission control pump 12 draws fluid from the reservoir 11 through a filter assembly 14. The pump 12 delivers pressurized hydraulic fluid to a transmission 16. The maximum pressure at the pump outlet 17 is determined by a pressure regulator valve 18, which delivers excess pump flow back to the outlet of the filter assembly 14. The pumped fluid first satisfies the transmission oil demand, including any clutch pressure requirements, then satisfies torque converter pressure requirements, if a torque converter is present in the transmission 16, then supplies lubrication and cooling, and finally the excess fluid is returned to the filter assembly 14 through passages such as 20.

The excess flow from the pressure regulator valve 18 is delivered to the outlet of the filter assembly 14 through a bypass passage 22. The excess fluid leaves the pressure regulator valve 18 with increased velocity and at an elevated pressure received from the pump, which is higher than the pressure at the reservoir 11.

Figure 2:
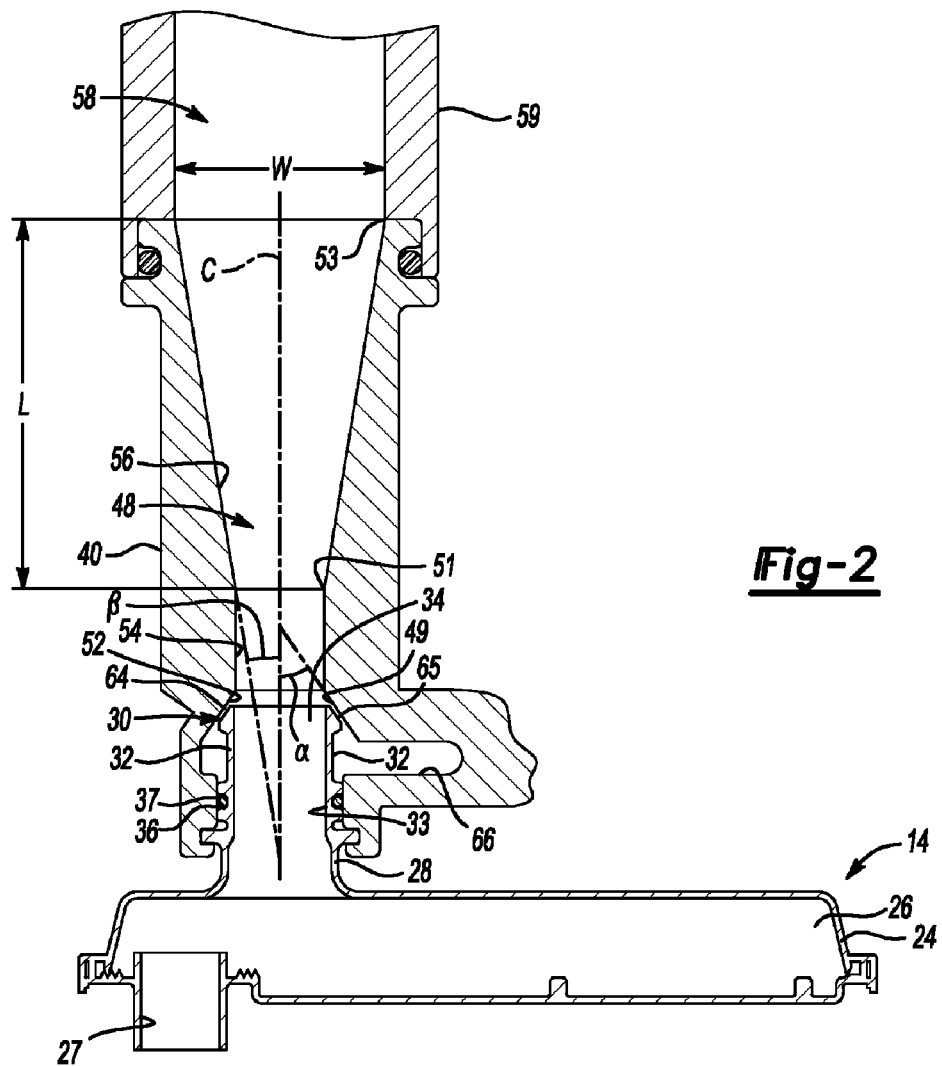
FIG. 2 is schematic cross-sectional illustration of a portion of the hydraulic system of FIG. 1 including a diffuser housing and a filter housing.

Referring to FIG. 2, the filter assembly 14 includes a filter housing 24 which has a filter element 26 secured therewith. A filter inlet 27 extends into the sump 11 of FIG. 1. A filter outlet portion 28 extends substantially perpendicular from the filter housing 24, and terminates at an opposite end in a filter nozzle 30. All of the hydraulic fluid, which enters from the reservoir 11 (of FIG. 1), passes through the filter element 26. The filter outlet portion 28 has a substantially annular recess 32 formed about an outer wall 33 of a filter outlet passage 34. The filter outlet passage 34 is formed internally of the filter outlet portion 28. All of the fluid passing through the filter element 26 also passes through the passage 34. The filter outlet portion 28 further includes a seal groove 36 formed adjacent the annular recess 32. The seal groove 36 is adapted to accommodate a seal 37.

The filter housing 24 is secured in a diffuser housing 40. The seal 37 is adapted to seal the interface between the filter housing 24 and the diffuser housing 40. The filter outlet portion 28 is positioned in a fluid inlet passage 48 formed by the diffuser housing 40 such that the hydraulic fluid leaving the filter outlet passage 34 enters the fluid inlet passage 48. The diffuser housing 40 forming the fluid inlet passage 48 reduces in diameter to form a converging portion 49 with an interior surface 52 of the diffuser housing 40 tapering inward at an angle a that is preferably a 10 degree angle with respect to a centerline C of the fluid inlet passage 48, but may have other values for packaging reasons, such as a 30 degree taper. The filter outlet portion 28 is coaxial with the converging portion 49. The fluid inlet passage 48 also has a neck portion 54 of constant cross-section (i.e., not converging or diverging) with respect to the centerline C.

Downstream of both the converging portion 49 and the neck portion 54 is a diverging portion 56, also referred to as a diffuser. A diffuser is a flow passage configured to decelerate a stream of liquid from a high velocity to a lower velocity, thereby increasing pressure. The diverging portion 56 flares outward at an angle β that is preferably 5 degrees with respect to the centerline C. The diverging portion has a length L and a width W at a widest terminal end 53. A ratio of the length L to the width W is preferably between about 6 and 8 for optimal efficiency of flow through the fluid inlet passage 48. However, a length to width ratio of anywhere from about 2 to 8 may be beneficial, and is dependent upon packaging and other design considerations.

The fluid inlet passage 48 may have a circular cross-section at any given cross-section taken perpendicular to the centerline C, with the diameter of the circular cross-section dependent upon the location of the cut (i.e., having various diameters over the tapering converging portion 49 and the flaring diverging portion 56). Alternatively, the cross-section may be of another shape of the same area as long as a smooth gradual transition is maintained with similar flow areas to sections cut through a circular cone. Thus, the diverging portion 56 has a generally frustoconical shape or similar alternative shape, such as an oval, from an end 51 at the neck portion 54 to the terminal end 53 at the widest portion. The housing 40 may be configured for packaging reasons such that the centerline C has a gradual bend, with the converging portion 49, neck portion 54, and diverging portion 56 remaining symmetrical about the centerline C, and maintaining the flow areas discussed above.

The fluid inlet passage 48 is in fluid communication with a downstream pump inlet port 58, also referred to as a pump inlet volume formed by pump housing 59. Although the pump housing 59 is shown as a separate component from the diffuser housing 40, with a seal therebetween, as may be required in the case of aluminum housings, it should be appreciated that the housings 40, 59 could be integrated as a single component, such as by using sand coring, especially in the case of cast iron housings. Furthermore, although the pump inlet port 58 is shown aligned with the centerline C of the fluid inlet passage 48, the inlet 58 could be angled with respect to the fluid inlet passage 48, as necessary for packaging considerations. The shape of the pump inlet port 58 may depend on packaging considerations for the specific type of pump rotating group utilized. The pump inlet port 58 may or may not contain a bend. Although one pump inlet port 58 is shown in this embodiment, it should be appreciated that the pump 12 may have additional inlet ports, which may vary in geometrical layout with respect to the fluid inlet passage 48 depending on the type of pump. As is well known, the pump 12 is a displacement device which draws fluid in through the inlet port 58 and delivers pressurized fluid through an outlet port or ports, not shown.

The terminal end of the nozzle 30 is configured to form a nozzle passage 64 between an exterior surface 65 of the nozzle 30 and the interior surface 52 of the diffuser housing 40. The nozzle passage 64 communicates hydraulic fluid from the annular recess 32 to the fluid inlet passage 48. Fluid enters the annular recess 32 through a fluid return passage 66 in the diffuser housing 40 that is in fluid communication with the bypass passage 22 of FIG. 1. The pressure regulator valve 18 (of FIG. 1) may be housed in or near the diffuser housing 40. The passage 66 is directly connected with the bypass passage 22 (of FIG. 1). The hydraulic fluid, which is bypassed at the pressure regulator valve 18, enters the annular recess 32 and is accelerated through the nozzle passage 64 to an increased velocity. This fluid leaves the nozzle passage 64 and enters the fluid stream in the fluid inlet passage 48 at the juncture of the filter outlet passage 34 and the fluid inlet passage 48.

Due to the high velocity of the fluid leaving the nozzle passage 64, the velocity of the fluid in the filter outlet passage 34 is increased. As is well known, when the velocity of a fluid increases, the pressure decreases. Thus, the pressure differential across the filter element 26 is increased such that more fluid from the reservoir 11 will be induced to pass through the filter element 26 than would occur without the pressure change caused by the flow through the nozzles passage 64. The fluid velocity is also increased through the inlet passage 48, further enhancing the inlet flow to the pump 12. The diffuser portion 56 enables recovery of pressure via a gradual deceleration of the fluid. This is especially useful for smaller displacement pumps which provide less bypass flow. As the hydraulic fluid enters the pump inlet port 58, this increased pressure helps to suppress cavitation in the pump 12. The increased pressure at the pump inlet 58 increases the cavitation speed of the pump, thereby decreasing the operating noise level at high pump speeds and decreases potential for damage to the pump 12. When cavitation is deferred, the pump 12 produces greater bypass flow, which in turn makes the nozzle 30 more effective at creating more net positive pressure at the pump inlet port 58. This cycle continues such that pump cavitation can be eliminated at all normal engine operating speeds.

Figure 3:
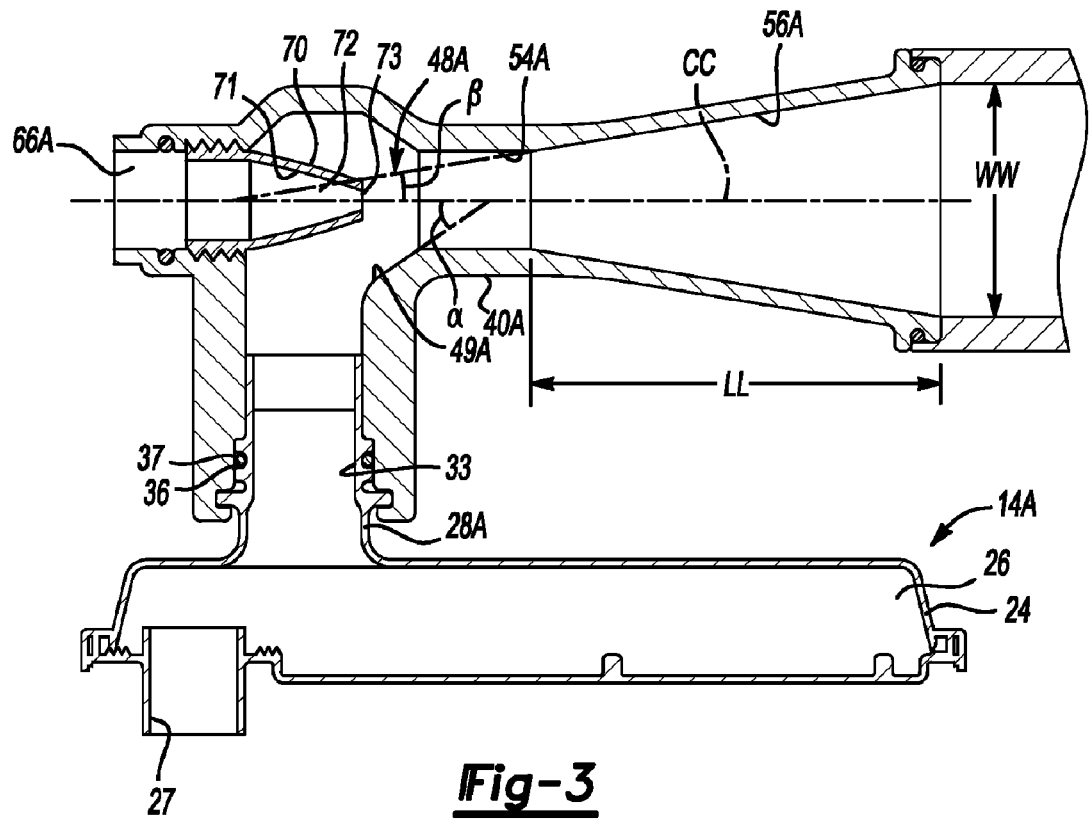
FIG. 3 is a schematic cross-sectional illustration of an alternative diffuser housing and filter housing for the hydraulic system of FIG. 1, including a nozzle insert.

Referring to FIG. 3, another embodiment of a filter assembly 14A and diffuser housing 40A is shown for use with the pump 12, transmission 16, pressure regulator valve 18 and sump 11 of FIG. 1 in place of the filter assembly 14 and diffuser housing 40 of FIG. 2. Components identical to those of FIGS. 1 and 2 are labeled with like reference numbers. In this embodiment, the diffuser housing 40A defines a fluid inlet passage 48A that is substantially perpendicular to the filter outlet portion 28A of the filter assembly 14A. This arrangement is particularly useful for packaging configurations where less space may be available above the filter assembly 14A.

The filter outlet portion 28A fits directly to the diffuser housing 40A without a nozzle or nozzle passage. Instead, a nozzle insert 70 is threaded or otherwise assembled into the housing 40A to define a nozzle passage 72. The nozzle passage 72 is directly aligned coaxial with a fluid return passage 66A that is in fluid communication with the bypass passage 22 of FIG. 1. Thus, a centerline CC of the fluid inlet passage 48A also serves as the centerline of the fluid return passage 66A and the nozzle insert 70.

The housing 40A is configured so that the fluid inlet passage 48A has a converging portion 49A, a neck portion 54A and a diverging portion 56A. The converging portion 49A and the diverging portion 56A are preferably of the same geometry as the corresponding portions of the fluid inlet passage 48 of FIG. 2. That is, the converging portion 49A preferably tapers inward at a 10 degree angle α with respect to centerline CC, and the diverging portion 56A preferably flares outward at a 5 degree angle β with respect to the centerline CC. Furthermore the length LL to width WW ratio of the diverging section 56A is preferably between 6 and 8, but may be between 2 and 8. The converging portion 49A is substantially perpendicular to the filter outlet portion 28A and generally aligned and coaxial along centerline CC with the fluid return passage 66A. In other embodiments, the fluid inlet passage may be at other angles between a perpendicular and a coaxial arrangement with the filter outlet portion 28A.

In the embodiment of FIG. 3, the high velocity flow of return fluid through the nozzle passage 72 from fluid return passage 66A creates suction of fluid in reservoir 11 of FIG. 1 through the filter inlet 27 and filter outlet portion 28A, increasing fluid flow to the pump inlet ports (not shown in FIG. 3 but upstream of the diverging portion 56A), thus decreasing cavitation. The nozzle insert 70 has a converging portion 71 that tapers to a nozzle outlet 73, thus increasing flow velocity through the nozzle insert 70. Also, the diverging portion 56A decreases velocity, increases pressure, thus further decreasing cavitation and increasing the high speed fill limit of the pump 12 of FIG. 1.

Figure 4:
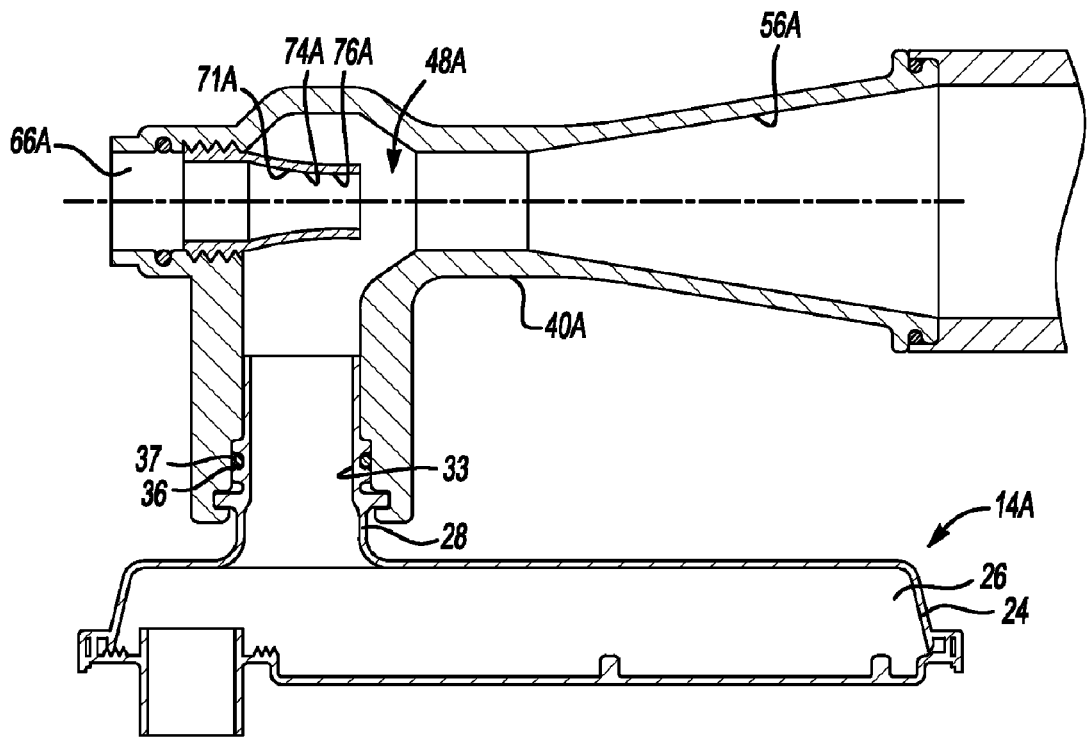
FIG. 4 is a schematic cross-sectional illustration of an alternative nozzle insert for use with the diffuser housing and filter housing of FIG. 3.

FIG. 4 illustrates the filter assembly 14A and diffuser housing 40A of FIG. 3, with an alternative nozzle insert 70A used in place of nozzle insert 70. Other components are identical to those of FIG. 3, and are numbered accordingly. Nozzle insert 70A is threaded or otherwise assembled to the diffuser housing 40A at the fluid return passage 66A and has a converging portion 71A, a neck portion 74A, and a diverging portion 76A. Like nozzle insert 70, nozzle insert 70A increases fluid velocity of fluid flowing from the fluid return passage 66A, creating suction of fluid from the sump 11 of FIG. 1 through the filter outlet portion 28. Again, the fluid inlet passage 48A is generally perpendicular to the filter outlet portion 28 and generally aligned with the fluid return passage 66A along centerline CC. This arrangement is particularly useful for packaging configurations where less space may be available above the filter assembly 14A.

While the best modes for carrying out the invention have been described in detail, those familiar with the art to which this invention relates will recognize various alternative designs and embodiments for practicing the invention within the scope of the appended claims.

The invention claimed is:

1. A hydraulic system for a transmission, comprising:
a diffuser housing having a fluid inlet passage feeding to at least one pump inlet port and a fluid return passage in fluid communication with the fluid inlet passage; and
a filter housing having a filter outlet portion in fluid communication with the fluid inlet passage upstream of the at least one pump inlet port;
wherein the fluid return passage is downstream of the filter outlet portion; wherein the fluid inlet passage has a converging portion downstream of the filter outlet portion and the fluid return passage, and has a diverging portion downstream of the converging portion feeding into the at least one pump inlet port; and wherein the diverging portion is characterized by a continuous gradual increase in flow area.

2. The hydraulic system of claim 1, wherein the diverging portion is characterized by a frustoconical shape, or a similar shape wherein any cross-section perpendicular to a center axis through the diverging portion has a flow area equal to a corresponding cross-section of the diverging portion of frustoconical shape.

3. The hydraulic system of claim 1, wherein the diverging portion of the diffuser housing flares outward at an approximately 5 degree flare.

4. The hydraulic system of claim 1, wherein the converging portion of the diffuser housing tapers inward at approximately a 10 degree taper.

5. The hydraulic system of claim 1, wherein the converging portion of the diffuser housing tapers inward at an approximately 30 degree taper.

6. The hydraulic system of claim 1, wherein the diverging portion is characterized by a length and by a width at a widest end; and wherein the ratio of the length to the width at the widest end is not less than 2 and not greater than 8.

7. The hydraulic system of claim 1, wherein the filter outlet portion is coaxial with the converging portion and forms a nozzle at a terminal end; wherein an annular inlet is formed around the nozzle between the nozzle and the converging portion; and wherein fluid from the fluid return passage reenters the fluid inlet passage through the annular inlet.

8. The hydraulic system of claim 7, further comprising:
a nozzle insert coaxial with the fluid return passage.

9. The hydraulic system of claim 1, wherein the fluid return passage is coaxial with the converging portion; and wherein fluid from the filter outlet portion enters the fluid inlet passage at an angle with the converging portion.

10. The hydraulic system of claim 8, wherein the nozzle insert has another converging portion.

11. The hydraulic system of claim 10, wherein the nozzle insert has another diverging portion downstream of the another converging portion.

12. A hydraulic system for a transmission, comprising:
a diffuser housing having a fluid inlet passage feeding to at least one pump inlet port and a fluid return passage in fluid communication with the fluid inlet passage; and
a filter housing having a filter outlet portion in fluid communication with the fluid inlet passage upstream of the at least one pump inlet port;
wherein the fluid return passage is downstream of the filter outlet portion; and wherein the fluid inlet passage has a diffuser portion flaring outward at a suitable angle based on packaging constraints.

13. The hydraulic system of claim 12, wherein the diffuser portion flares outward at approximately a 5 degree flare; and wherein the fluid inlet portion has a converging portion upstream of the diffuser portion that tapers inward at approximately a 10 degree taper.

14. The hydraulic system of claim 12, wherein the diffuser portion is characterized by a length and by a width at a widest end; and wherein the ratio of the length to the width at the widest end is not less than 6 and not greater than 8.

15. The hydraulic system of claim 12, wherein the diffuser portion is characterized by a length and by a width at a widest end; and wherein the ratio of the length to the width at the widest end is not less than 2 and not greater than 8.

16. The hydraulic system of claim 12, wherein the fluid return passage is coaxial with the converging portion; and wherein fluid from the filter outlet portion enters the fluid inlet passage at an angle with the converging portion.

17. The hydraulic system of claim 12, further comprising:
a nozzle insert coaxial with the fluid return portion.

18. The hydraulic system of claim 17, wherein the nozzle insert has another converging portion.

19. The hydraulic system of claim 18, wherein the nozzle insert has another diverging portion downstream of the another converging portion.

20. A hydraulic system for a transmission, comprising:
a diffuser housing having a fluid inlet passage feeding to at least one pump inlet port and a fluid return passage in fluid communication with the fluid inlet passage;
a pressure regulator valve controlling fluid return from the pump to the fluid return passage;
a fluid sump; and
a filter housing mounted to the sump and having a filter outlet portion in fluid communication with the fluid inlet passage upstream of the at least one pump inlet port;
wherein the fluid return passage is downstream of the filter outlet portion; wherein the fluid inlet passage has a converging portion downstream of the filter inlet portion and the fluid return passage, and has a diverging portion downstream of the converging portion feeding into at least one pump inlet port; and wherein the diverging portion is characterized by a frustoconical shape from the converging portion to the at least one pump inlet port.

* * * * *